(12) United States Patent
Astefanous

(10) Patent No.: US 11,097,454 B2
(45) Date of Patent: Aug. 24, 2021

(54) HYBRID PART MANUFACTURING SYSTEM AND METHOD

(71) Applicant: GE AVIATION SYSTEMS LLC, Grand Rapids, MI (US)

(72) Inventor: Christopher Mouris Astefanous, Centereach, NY (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 190 days.

(21) Appl. No.: 16/215,172

(22) Filed: Dec. 10, 2018

(65) Prior Publication Data

US 2019/0105816 A1 Apr. 11, 2019

Related U.S. Application Data

(62) Division of application No. 15/043,965, filed on Feb. 15, 2016, now Pat. No. 10,179,430.

(51) Int. Cl.
*B29C 45/00* (2006.01)
*B29C 70/48* (2006.01)
(Continued)

(52) U.S. Cl.
CPC .......... *B29C 45/0003* (2013.01); *B29C 45/33* (2013.01); *B29C 64/106* (2017.08); *B29C 70/48* (2013.01); *B29C 45/0055* (2013.01); *B29C 45/1418* (2013.01); *B29C 64/10* (2017.08); *B29C 64/118* (2017.08);
(Continued)

(58) Field of Classification Search
CPC . B29C 45/33; B29C 45/0003; B29C 45/0055; B29C 45/1418; B29C 45/14786; B29C 45/73; B29C 64/106; B29C 64/118; B29C 64/10; B29C 70/48; B29L 2031/085; B29L 2031/082; B29K 2307/04; B29K 2105/101
USPC .......... 264/257, 328.1, 328.7, 328.8, 328.11; 425/542
See application file for complete search history.

(56) References Cited

U.S. PATENT DOCUMENTS 5,529,471 A 6/1996 Khoshevis
6,612,824 B2 9/2003 Tochimoto et al.
(Continued)

FOREIGN PATENT DOCUMENTS

CN 101279497 A 10/2008
CN 104827629 A 8/2015
(Continued)

OTHER PUBLICATIONS

"Low pressure molding," Wikipedia, Retreived from Internet URL: http://en.wikipedia.org/wiki/Low_pressure_molding, on Nov. 3, 2017, last modified on Sep. 22, 2017, pp. 2.
(Continued)

*Primary Examiner* — Joseph S Del Sole
*Assistant Examiner* — Lawrence D. Hohenbrink, Jr.
(74) *Attorney, Agent, or Firm* — McGarry Bair PC

(57) ABSTRACT

A system and method for manufacturing a part in a mold having a mold cavity including a printhead for depositing a first material within the mold cavity, and an injection head for depositing a second material within the mold cavity. A part can be made in the mold cavity by the cooperative use of both injection molding and additive manufacturing steps.

19 Claims, 12 Drawing Sheets

(51) Int. Cl.
  *B29C 45/33* (2006.01)
  *B29C 64/106* (2017.01)
  *B29C 64/118* (2017.01)
  *B29K 105/10* (2006.01)
  *B29L 31/08* (2006.01)
  *B29C 64/10* (2017.01)
  *B29C 45/14* (2006.01)
  *B33Y 10/00* (2015.01)
  *B33Y 30/00* (2015.01)
  *B29K 307/04* (2006.01)

(52) U.S. Cl.
  CPC .... *B29K 2105/101* (2013.01); *B29K 2307/04* (2013.01); *B29L 2031/082* (2013.01); *B29L 2031/085* (2013.01); *B33Y 10/00* (2014.12); *B33Y 30/00* (2014.12); *Y02P 70/50* (2015.11)

(56) References Cited

U.S. PATENT DOCUMENTS

| | | | |
|---|---|---|---|
| 6,814,823 | B1 | 11/2004 | White |
| 8,535,049 | B2 | 9/2013 | MacLeod |
| 2004/0245428 | A1 | 12/2004 | Moshe et al. |
| 2014/0001673 | A1 | 1/2014 | Takahashi |
| 2015/0014881 | A1 | 1/2015 | Elsey |
| 2015/0035200 | A1 | 2/2015 | Karpas et al. |
| 2015/0203411 | A1 | 7/2015 | Xu |
| 2015/0314499 | A1* | 11/2015 | Asanuma .................. C08K 7/14 428/174 |
| 2016/0185021 | A1* | 6/2016 | Olaru ...................... B29C 45/78 264/40.1 |
| 2018/0321659 | A1* | 11/2018 | Dasappa ............ G05B 19/4099 |

FOREIGN PATENT DOCUMENTS

| | | | | |
|---|---|---|---|---|
| EP | 1 977 875 | A1 | | 10/2008 |
| EP | 1977875 | A1 | * | 10/2008 ......... B29C 45/0053 |

OTHER PUBLICATIONS

Boivie, K., et al., "Hybrid manufacturing; integration of additive technologies for competitive production of complex tools and products," 15th International Research/Expert Conference on Trends in the Development of Machinery and Associated Technology, pp. 53-56 (Sep. 12-18, 2011).

International Search Report and Written Opinion issued in connection with corresponding PCT Application No. PCT/US2017/017591 dated Apr. 19, 2017.

* cited by examiner

US 11,097,454 B2

HYBRID PART MANUFACTURING SYSTEM AND METHOD

CROSS-REFERENCE TO RELATED APPLICATION

This application is a division of U.S. application Ser. No. 15/043,965, filed on Feb. 15, 2016, now U.S. Pat. No. 10,179,430, issued Jan. 15, 2019, titled "HYBRID PART MANUFACTURING SYSTEM AND METHOD", which is hereby expressly incorporated herein by reference in its entirety.

BACKGROUND OF THE INVENTION

The subject matter disclosed herein relates to a manufacturing system and method with both injection molding and additive (3-D printing) features. Injection molding and various techniques therefor have become ubiquitous in the manufacturing sector. Recently, "additive" manufacturing techniques, also referred to as "3-D printing" have come into favor, typically in the rapid prototyping stage of product development. A challenge with injection molding and additive manufacturing processes is maintaining uniform temperatures during the part-manufacturing process. This constraint can limit the size and production rate of components that can be made by these processes. Both techniques can also be constrained in the way that parts can be oriented during manufacturing and the kinds of features (e.g., undercuts, thin structures) that can be fabricated using these techniques.

BRIEF DESCRIPTION OF THE INVENTION

In one aspect, aspects of the present disclosure relate to a hybrid part manufacturing system. In one embodiment, a mold can have a set of movable mold portions, wherein, in a first molding position, the set of mold portions can cooperate to define an injectable mold cavity, and wherein, in a second additive manufacturing position, the set of mold portions can be repositioned to define an access area for additive manufacturing operations to be performed on a part formed inside the injectable mold cavity.

In another aspect, aspects of the present disclosure relate to a method for manufacturing a part in a mold, wherein the mold includes a mold cavity, including the steps of: providing a source of injectable material; providing a source of printable material; closing the mold to form a closed mold cavity; forming a portion of a part within the mold cavity with a first volume of the injectable material; opening at least a portion of the mold to allow access to the portion of the part formed in the mold cavity; printing a second volume of the printable material onto the portion of the part formed in the mold cavity to form an additional portion of the part; and removing the formed part from the mold.

In another aspect, aspects of the present disclosure relate to a system for making a part including: a mold having a mold cavity; a printhead for depositing a first material within the mold cavity; an injection head for depositing a second material within the mold cavity; wherein a part is formed by the cooperative deposition of the first material by the printhead and the second material by the injection head.

DETAILED DESCRIPTION OF EMBODIMENTS OF THE INVENTION

Figure 1:
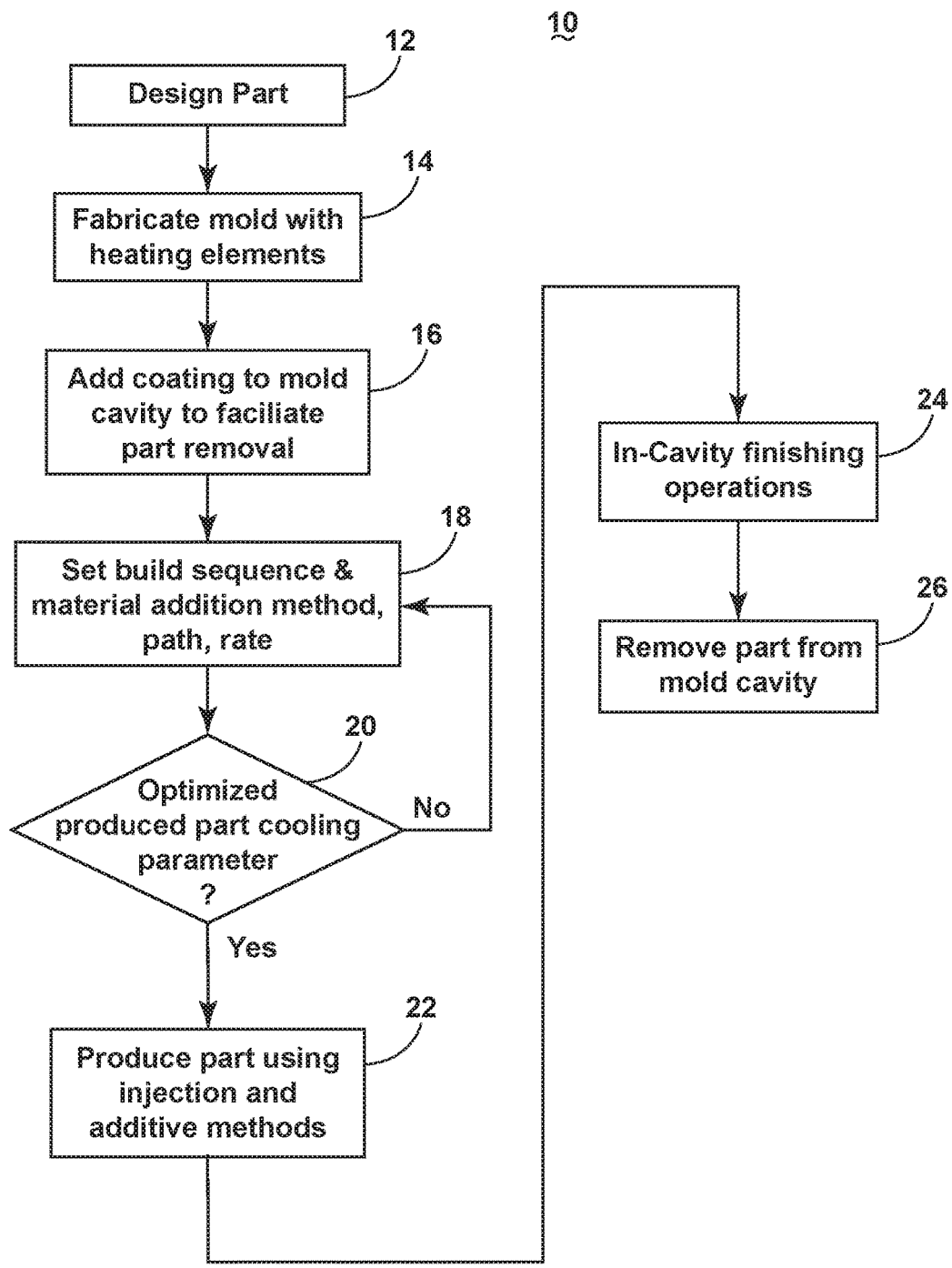
FIG. 1 shows a flow chart illustrating an exemplary method of manufacturing a part in a mold.

Turning now to the drawings and to FIG. 1 in particular, a method 10 is illustrated for forming parts in a mold by using both injection-type manufacturing methods and additive manufacturing methods, which can also be referred to as 3-D printing methods, according to aspects of the present disclosure. The term "hybrid" is used herein to refer to the ability of the system and method described herein to permit the manufacture of a part in a mold using both injection molding and additive manufacturing techniques.

In the method 10 of FIG. 1, the method 10 begins with step 12 in which the part is designed using typical CAD/CAM manufacturing and design methods. Once the part is designed in step 12, a suitable mold can be fabricated, typically with heating elements provided in the mold to ensure uniform heating of the mold and the part material at step 14. Optionally, at step 16, a coating can be added to the mold cavity within the mold to facilitate part removal when the mold is opened to remove the formed part therefrom.

The terms "mold" and "mold cavity" are used as would be understood by one skilled in the art to which aspects of the present disclosure pertains. Various examples of a mold and mold cavity are discussed herein, and the particular examples discussed should not be construed as being limiting on the scope of the present disclosure. In general, a mold as described herein need only describe or define a mold cavity in which the part can be molded. In various examples, the mold can have a set of movable mold portions. It will be understood that "a set" can include any number of the respectively described elements, including only one element. The mold portions can be movable between a first position and a second position. The first position can be considered a first molding position in which the set of mold portions can cooperate to define an injectable mold cavity in which a part can be formed by injection molding techniques. The second position can be considered a second additive manufacturing position, in which the set of mold portions can be repositioned to define an access area for additive manufacturing operations to be performed on the part being formed in the mold cavity.

The terms "injectable material" is used generally herein to refer to any suitable material used in molding operations, and injection molding operations in particular, although any particular material can be used without departing from the scope of aspects of the present disclosure. The term "printable material" is used generally herein to refer to any suitable material used for additive manufacturing operations. The injectable material and printable material can be the same material or different materials. If different materials are used they can be complementary materials that can form an integral relationship when used in a common part.

At step 18, part formation and manufacturing processing parameters can be set on the particular mold equipment that is used to control and operate the mold, such as a build sequence for the mold and material addition method, and rates that the material is to be added to the process. At step 18, the mold parameters and processing parameters can include a decision in which particular portions of the part being formed can be formed by adding material using injection molding techniques and, in other steps of the build sequence for the part being formed in the mold at step 18, portions of the part being formed can be made by additive manufacturing techniques.

At step 28, it is determined whether the build sequence determined in step 18 produces optimized part cooling. If so, processing moves to step 22 in which production runs of the part formed in the mold can be made using the build sequence set in step 18 to form the part using injection molding and additive manufacturing techniques. If the decision point at 20 does not result in an optimized part cooling parameter for the part being formed in the mold, processing can return to step 18 to insert different parameters in the build sequence for forming the part in the mold.

After step 22, processing can move to step 24 in which finishing operations can be performed on the part being formed in the mold within the mold cavity. At step 26, the formed part is removed from the mold.

It will be understood that injection molding techniques and other references to injection molding are referred to generally as any manufacturing process in which flowable material is provided into a mold cavity, including, but not limited to, high-pressure and low-pressure injection molding techniques. It will also be understood that additive manufacturing techniques are referred generally herein to a manufacturing process in which certain features of a formed part are added step-wise by repetitively printing small portions of the part from a print head. For example, a part can be formed in a mold by using both injection-molding techniques as well as additive manufacturing techniques in the same molding operation.

Figure 2:
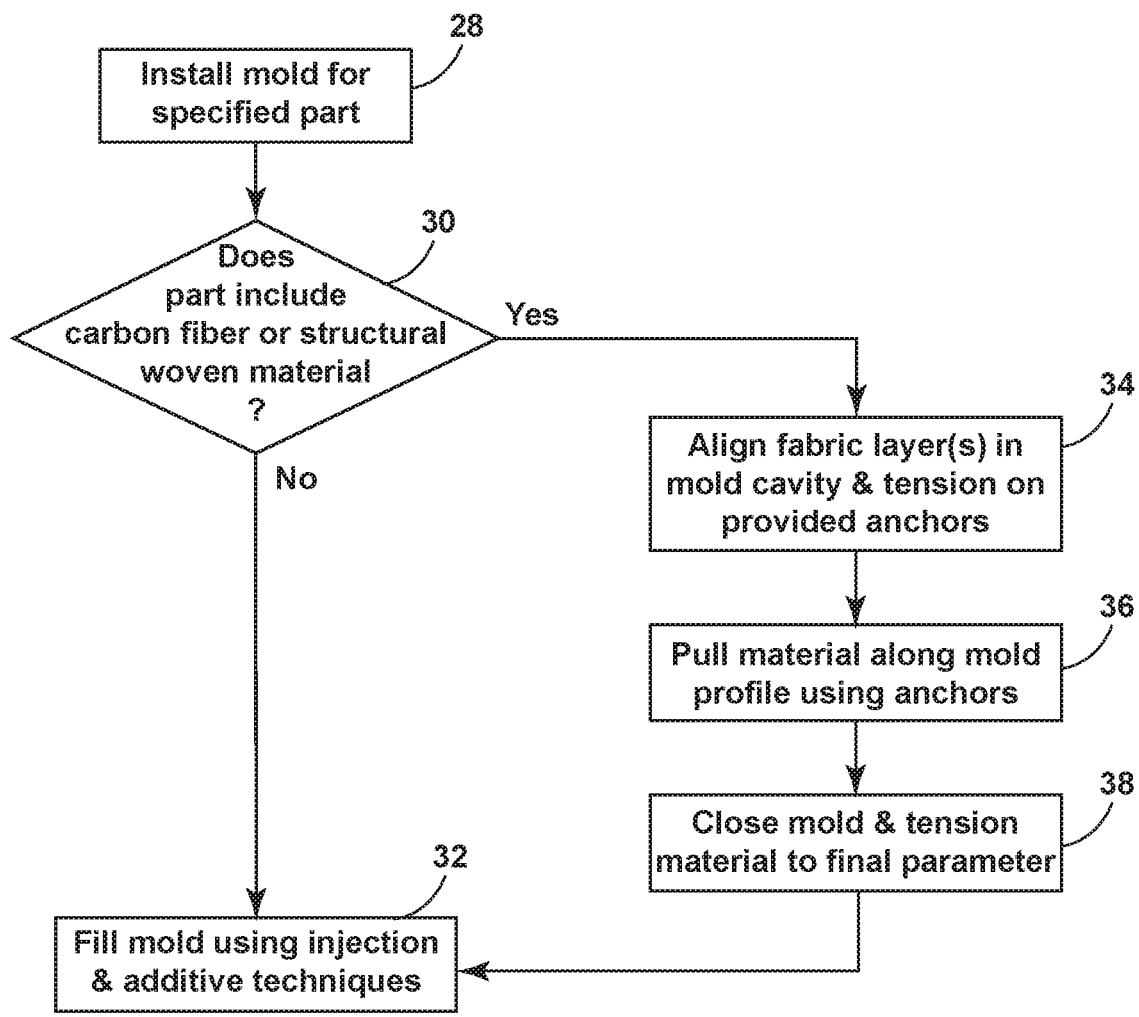
FIG. 2 illustrates a step for producing part a using injection molding and additive manufacturing methods from one or more of the steps of FIG. 1 in greater detail.

Turning to FIG. 2, step 22, which was shown in FIG. 1, refers to producing a part in a mold cavity using injection molding and additive manufacturing methods and is shown in greater detail. For example, at step 28, a mold for a specified part is installed in a molding device. At 30, a decision is made as to whether the part to be formed in the mold includes any sort of fabric layer or portion formed from carbon fiber or a woven material, often referred to as a structural woven material. If the part does not include this type of material, processing moves to 32 in which the mold is filled using injection molding techniques and additional features of the part are formed by additive manufacturing techniques as shown in step 32.

If, at step 30, it is determined that the part does include some sort of woven material or carbon fibers, processing moves to step 34 in which one or more fabric layers are aligned within the mold cavity and can optionally detention and on provided anchors located within portions of the mold in the mold cavity.

At step 36, the carbon fiber or structural material is pulled along the mold profile using the anchors to locate the carbon fiber or woven material within the mold cavity. At 38, the mold is closed and the material is tensioned to a final desired parameter. Once the carbon fiber or structural woven material is located within the mold cavity as described in steps 34-38, processing returns to step 32 in which the mold cavity is filled using injection holding and additive manufacturing techniques to produce a part including the located carbon fiber or structural woven material.

Figure 3:
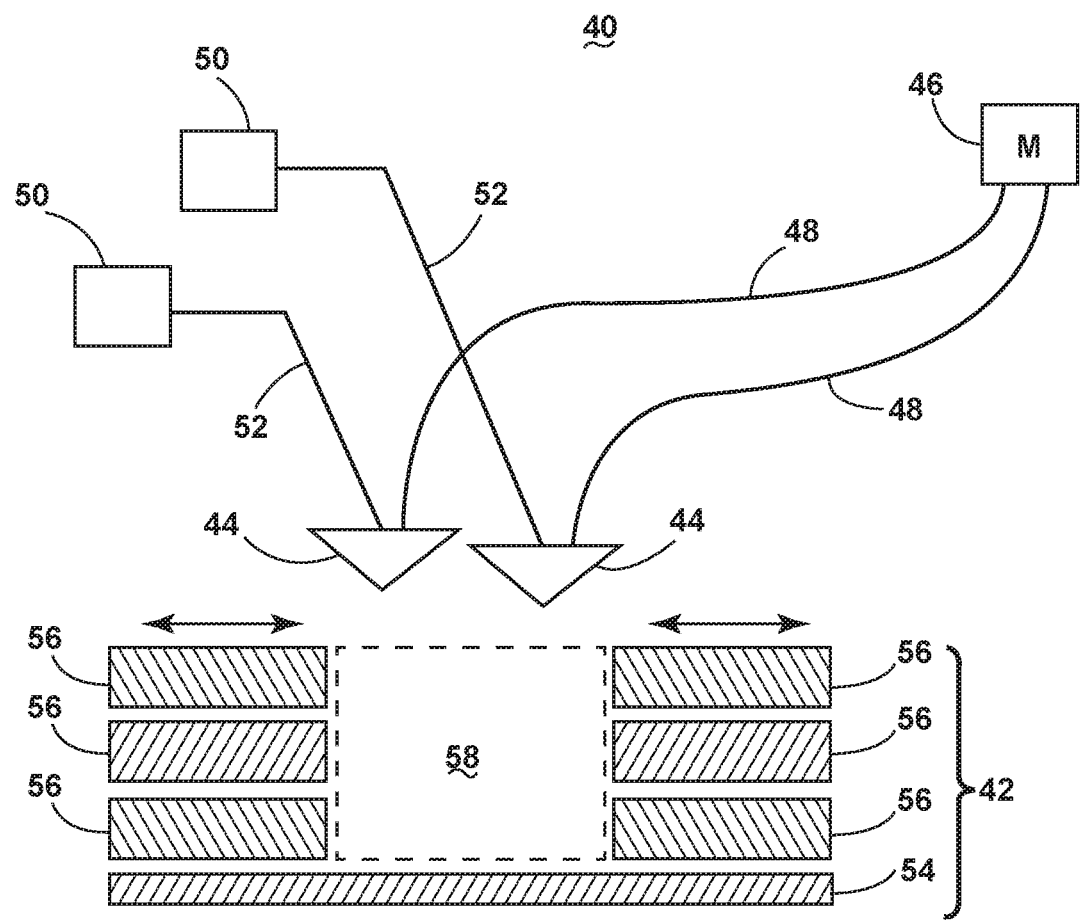
FIG. 3 is a schematic side elevational view of a system for manufacturing a part using molding and additive manufacturing techniques shown with respect to the methods described with respect to FIGS. 1-2.

Turning to FIG. 3, an example system for manufacturing a part in a mold using the hybrid injection molding and additive manufacturing techniques described herein with respect to aspects of the present disclosure, including those described by example in FIGS. 1-2, is generally described with reference numeral 40. It will be understood by one skilled in the art that FIG. 3 illustrates the system 40 schematically. The components described in FIG. 3 would be apparent to one skilled in the art.

The system 40 includes a mold shown generally by reference 42, and a set of material dispensers 44 movably positioned with respect to the mold 42. The material dispensers 44 are interconnected with a source 46 of material for making at least portions of a part in the mold 42. It will be understood that the source 46 of material for the part can include a source of injectable material, a source of printable material, or both. Furthermore, the source 46 can provide additional sources of material other than the two classes of materials mentioned herein. In addition, the material dispensers 44 are shown interconnected to the source 46 by supply lines 48. The material dispensers 44 are shown interconnected to controller(s) 50 by a suitable communication connection 52, as shown in FIG. 3. With this configuration, the controller(s) 50, via the connection 52, can control the position of the material dispensers 44, preferably over multiple axes of movement and rotation. The material dispensers 44 can be provided with injectable material or printable material, or both, through the supply lines 48 from the source of material 46. The number of material dispensers 44 can be selected for a given part production application, multiple material dispensers 44 can be employed to increase part production rates, match fill times, and to promote uniform cooling.

As also shown in FIG. 3, the mold 42 can be any suitable molding equipment, including, but not limited to, a mold for creating a part using flowable material (such as material typically used in high- or low-pressure injection molding operations, which would be apparent to one skilled in the art). In the example embodiment shown in FIG. 3, the mold 42 includes a base platform 54 with a set of mold portions 56, which cooperate to define a mold cavity 58 in which a part can be manufactured. It will be understood that the mold portions 56 can be movable about at least one axis, and preferably three axes of linear movement and at least one axis of rotational movement, with respect to the base platform 54 so that the mold cavity 58 can be positioned into a first molding position in which flowable or injectable material can be provided from the source 46 through the supply lines 48 and to the material dispensers 44 for dispensation into the mold cavity 58 to form at least a portion of a part within the mold cavity 58 as defined by a desired shape of the mold cavity, typically with a tooling element placed therein. As shown by the arrows above the set of mold portions 56, the mold portions can be movable with respect to the mold cavity 58 to position the mold cavity 58 into a first molding position wherein the mold cavity is preferably enclosed for injection molding operations, and a second open or additive manufacturing position. In the second position, the mold 42 and, in particular, the mold cavity 58, can be accessible by the material dispensers 44 to provide additive manufacturing operations on the portion of a part formed by injection molding operations within the mold cavity 58. The material dispensers 44 can be movable so as to be positionable within the mold cavity 58. Further, control logic can be provided to the material dispensers 44 by the controllers 50 to prevent each material dispenser 44 from coming into a motion path of another material dispenser 44 as well as to prevent material dispensed by the material dispensers 44 from impinging on another material dispenser. It would be apparent to one skilled in the art that material dispensed by the material dispensers 44 can be in any direction therefrom, toward or away from the mold portions 50, although it would also be apparent to one skilled in the art that it can be preferred to inject material toward the mold portions 50 because in-mold material cannot be depended upon to flow toward boundary areas of the mold cavity 58.

Figure 4:
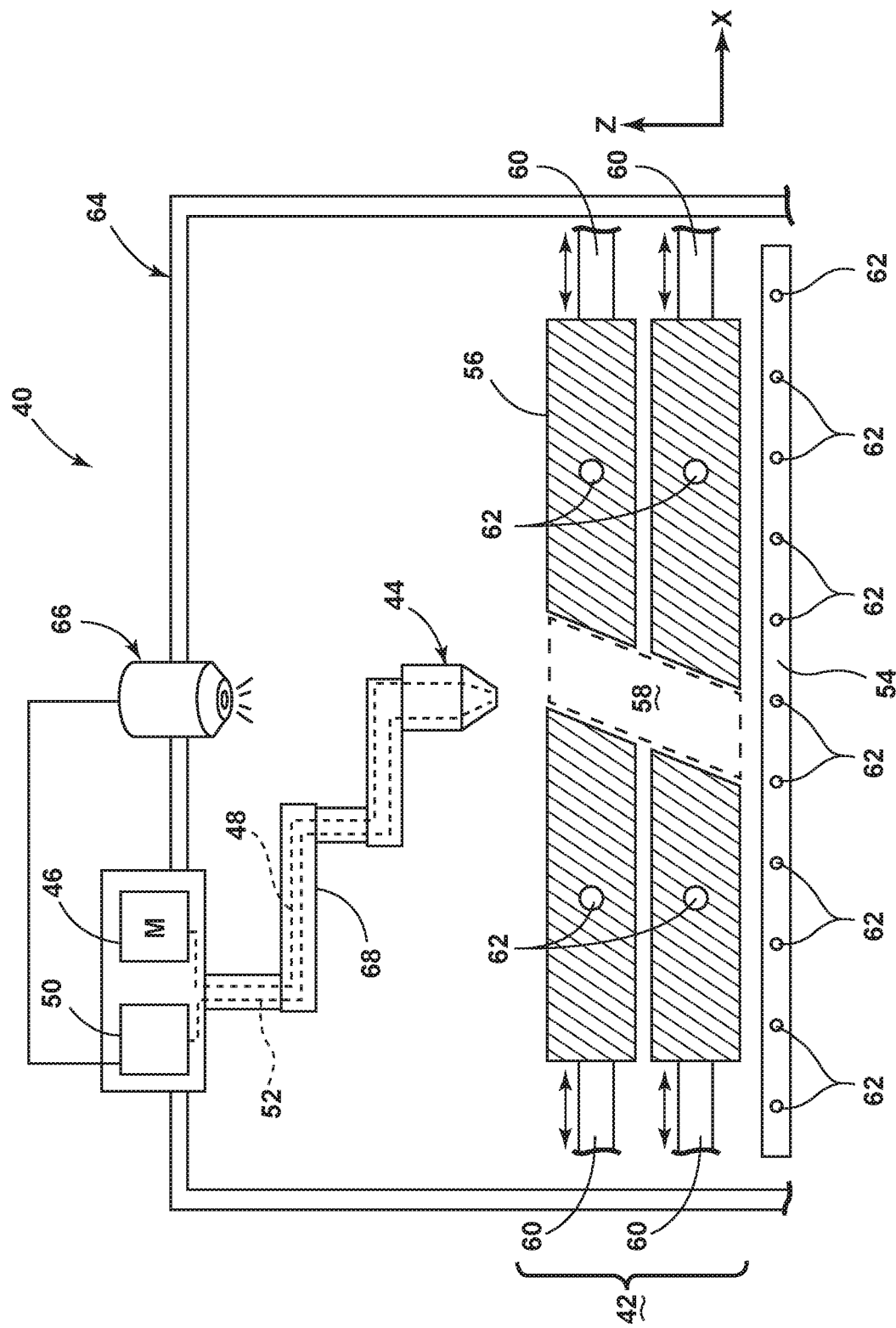
FIG. 4 is a side elevational view of the schematic shown in FIG. 3 showing greater detail on the molding and additive manufacturing components.

FIG. 4 shows an example of the system 40, introduced with respect to FIG. 3, in greater detail. Common components shown in FIG. 3 and discussed with respect to FIG. 4 are described with, and referenced, with common reference numerals, and their description is not repeated. In the example shown in FIG. 4, the set of mold portions 56 are shown having an actuator 60, which is configured to provide lateral movement to a corresponding mold portion 56 to allow the mold portion 56 to be moved between the first and second positions for the mold 42. Optional heating channels 62 are illustrated as being provided in the molding portions 56 and the base platform 54. The movement of the mold portion 56 is illustrated by the arrows positioned adjacent to the actuator(s) 60. In this way, the size and accessibility of the mold cavity 58 can be adjusted in accordance with the build process set in the method 10 described with respect to FIGS. 1-2.

In FIG. 4, the system 40 is shown enclosed within a housing 64 this can provide the material dispenser 44 an environment within which to operate and perform both injection molding and additive manufacturing operations on a part being formed in the mold cavity 58. An optional imaging system, such as a camera shown by reference numeral 66, can be provided associated with the housing 64 to allow for imaging to be performed on the manufacturing operations performed within the housing 64 and to provide feedback to a controller 50 provided for the material dispenser 44. Further, the camera 66, if it has infrared detection capabilities, could be used to provide feedback to one or more controllers 50 for controlling heating elements in the mold 42 and to assess cooling of the part being formed, as well as readiness for the next stages of operations to be performed on a part in the mold cavity 58. The camera 66 can be any known type, including visual and infrared. While a single camera 66 located in an upper center area of the housing 64 is shown in FIG. 4, it would be apparent to one skilled in the art that the number of cameras 66 could be increased without departing from the scope of this invention. Furthermore, the position of the cameras 66 could be located anywhere associated on or within the housing 64 without departing from the scope of the invention.

Figure 5:
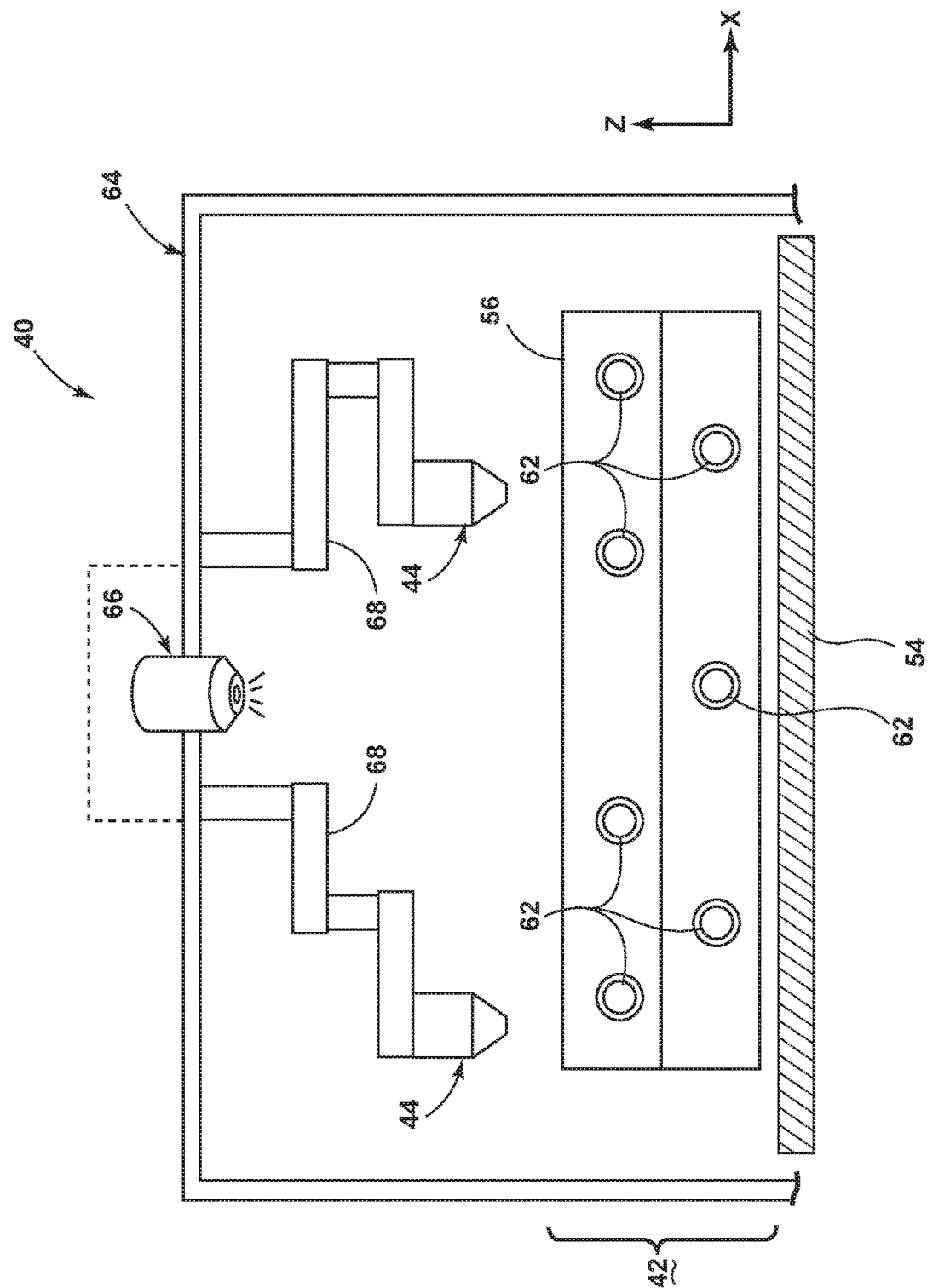
FIG. 5 is an end elevational view of the schematic shown in FIG. 4.

FIG. 5 is an end view of the embodiment of the system 40 shown in FIG. 4. As would be understood by one skilled in the art, the system 40 contemplates the use of one, or more than one, material dispenser 44 interconnected with a source 46 of injectable or printable material and a controller 50 for positioning the material dispenser 44 within the housing 64. With the multiple material dispensers 44 shown in the example of FIG. 5, it will be understood that multiple material dispensers could be sealingly interfaced with the mold cavity 58 to provide injectable material at multiple locations for injection molding operations within the mold cavity 58. In addition, because the material dispensers 44 can also have a printhead provided thereon, it would be within the scope of the present disclosure for the material dispensers 44 within the housing 64 to provide additive manufacturing techniques on a part being formed in the mold cavity 58 at different locations thereof.

In addition, it is also within the scope of the present disclosure, and would be apparent to one skilled in the art, that one material dispenser 44 could have an injection molding nozzle provided thereon for injecting a source of injectable material from the source 46 into the mold cavity 58 and another material dispenser 44 provided within the housing 64 could have a printhead provided thereon and be interconnected to a source 46 of printable material. In this example embodiment, one material dispenser 44 could provide injectable material during an injection molding operation within the mold cavity 58 and then another material dispenser 44 could then perform additive manufacturing operations by dispensing printable material from a source 46 of printable material after portions of the part have been formed by injection molding.

As shown in FIGS. 4-5, the material dispenser 44 is shown on an arm 68 which can be articulated, preferably in three axes and at least about one axis of rotation, throughout the housing 64 to reposition the material dispenser 44 in any number of locations within the housing 64 with respect to the mold cavity 58. It will be understood that the particular configuration of the arm 68 can be any form of a robotic, mechanical or electromechanical device and would not be limiting on the scope of the present disclosure with respect to the particular implementation of the arm 68 used to move the material dispenser 44 associated with the arm 68 within the housing 64.

Figure 6:
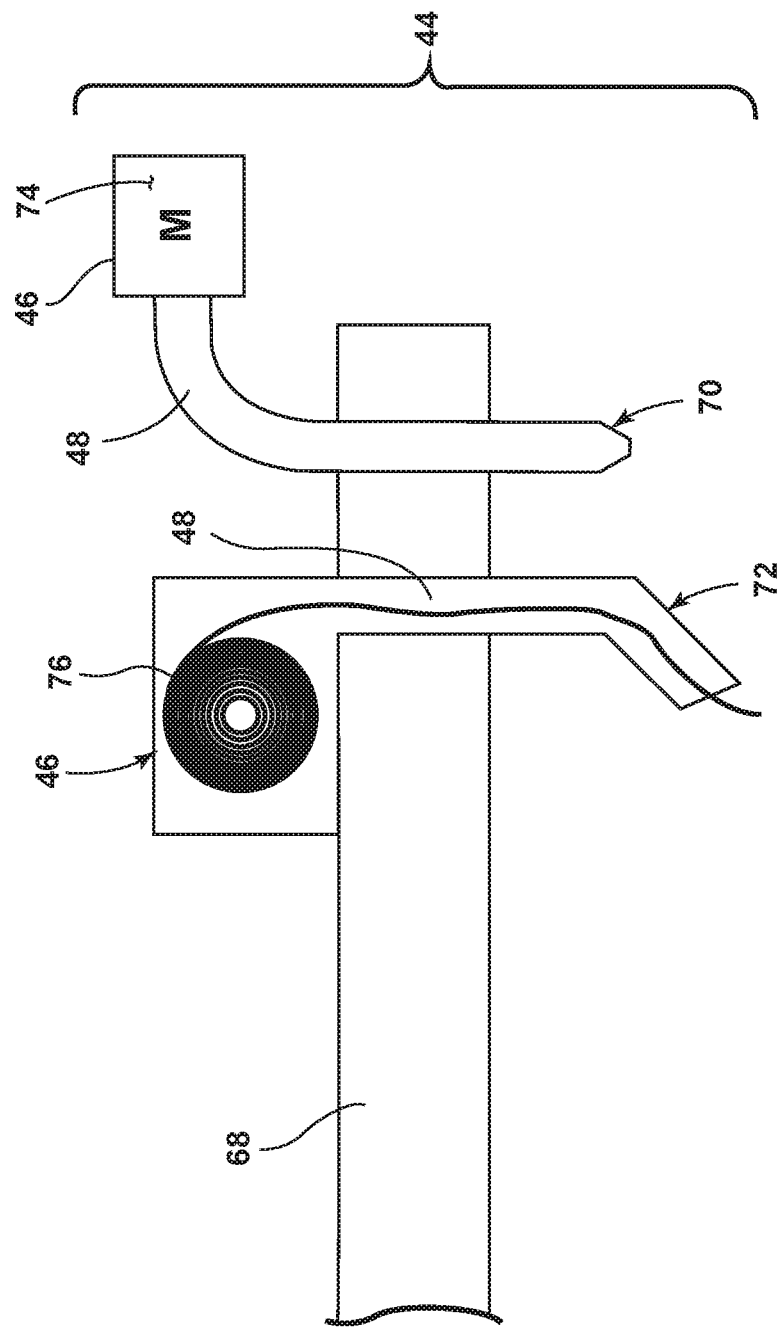
FIG. 6 is a device for providing injectable and printable material for the system shown in FIGS. 3-5 and according to the methods described with respect to FIGS. 1-2.
Figure 7:
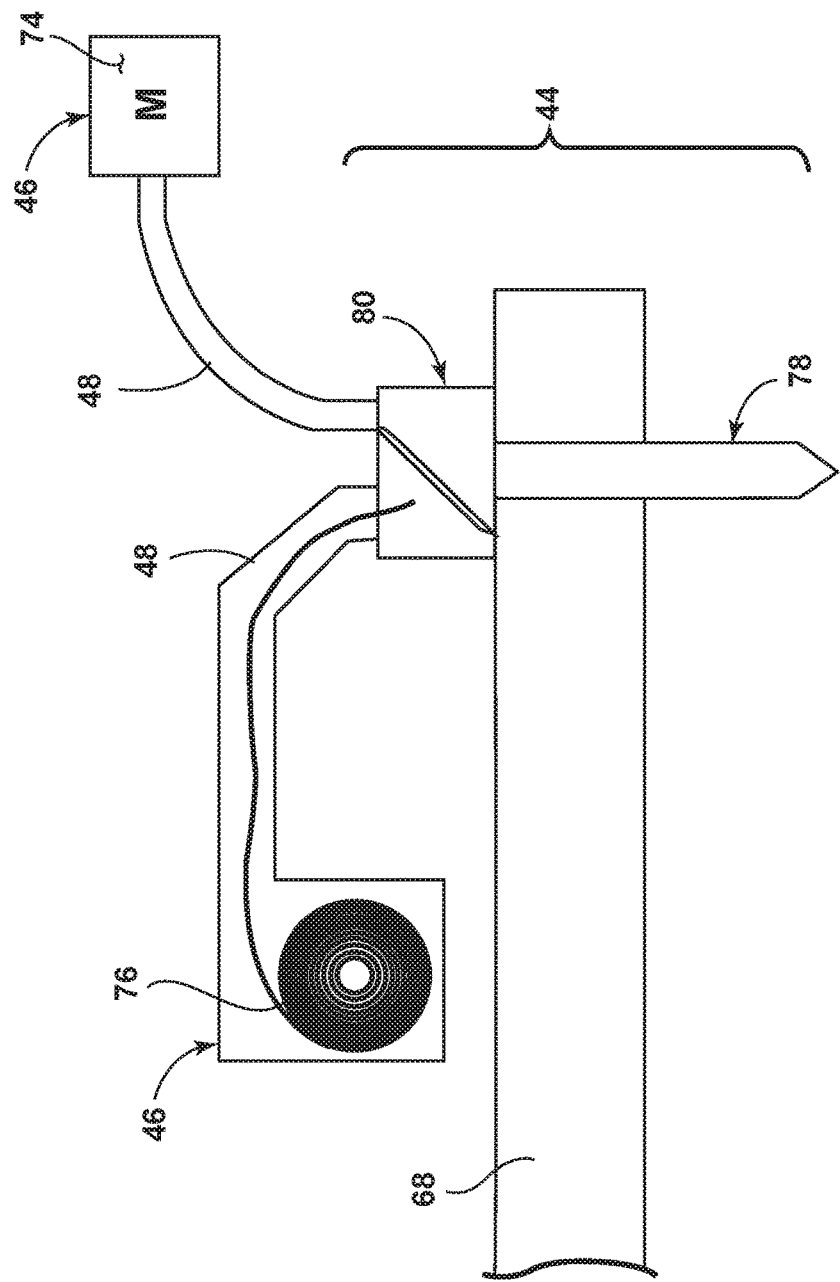
FIG. 7 is a device for providing injectable and printable material in accordance with various aspects described herein.
Figure 8:
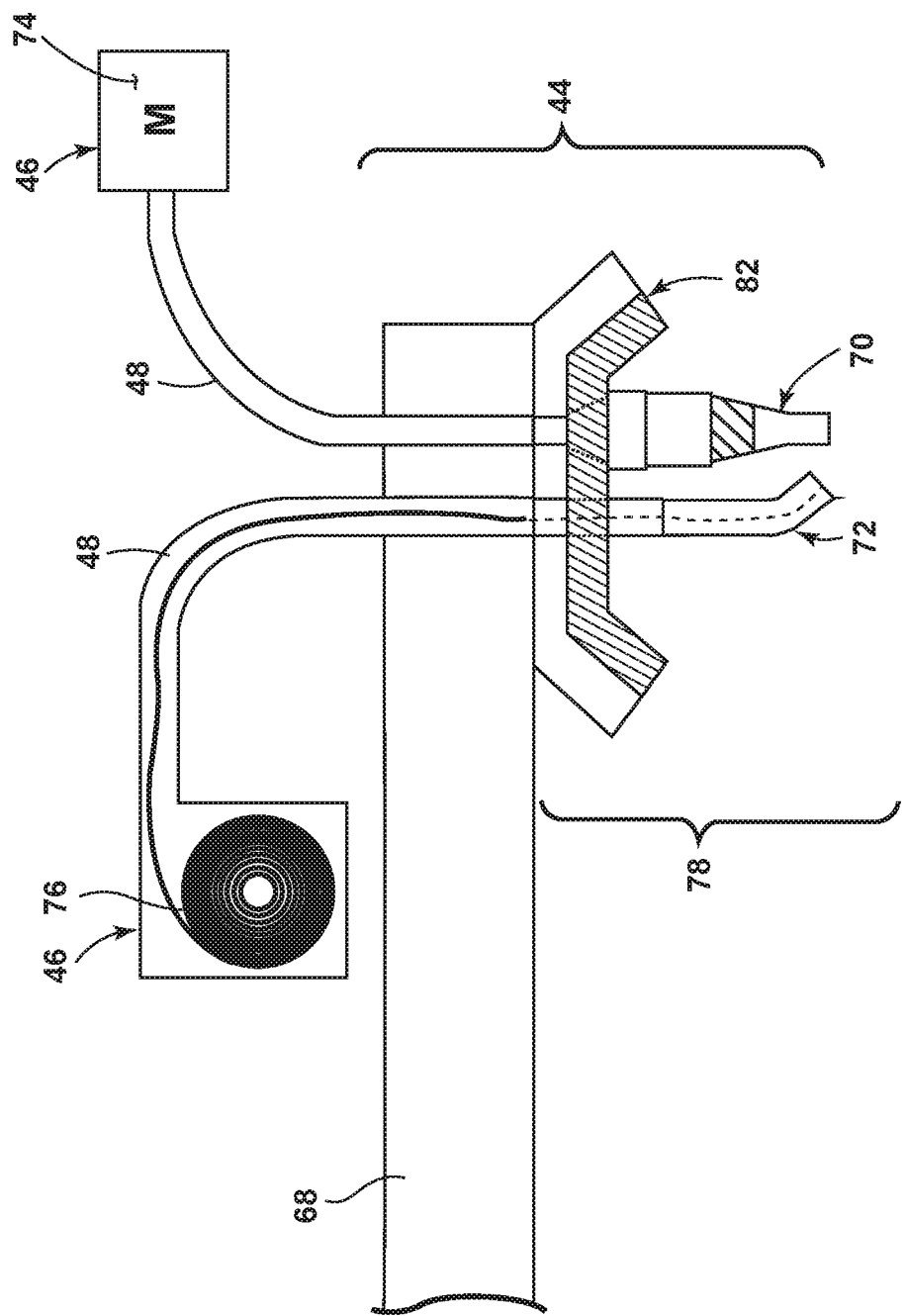
FIG. 8 is a device for providing injectable and printable material in accordance with various aspects described herein.

FIGS. 6-8 illustrate various embodiments of the material dispenser 44 as shown by example in FIGS. 4-5. It will be understood that the illustrations of FIGS. 6-8 are by example only, and are provided to illustrate the flexibility and adaptability of the material dispenser 44 according to aspects of the present disclosure, but should not be construed as limiting upon the scope of the present disclosure. In FIGS. 6-8, the material dispenser 44 is shown on a portion of the arm 68 for articulating and positioning the material dispenser 44 within the housing 64 described with respect to FIGS. 4-5 but not shown in the enlarged inset orientations of FIGS. 6-8. In the exemplary illustrations shown in FIGS. 6-8, a radiative heater (not shown for brevity) can be provided on the arm 68 or on the material dispenser 44 itself to provide controllable heat to the injection and additive manufacturing operations pursuant to the system 40 and method 10 described herein.

Turning to FIG. 6, an embodiment of the material dispenser 44 is shown having both a nozzle 70 positioned adjacent an end of the arm 68 and a printhead 72, preferably positioned adjacent to the nozzle 70. The nozzle 70 is shown interconnected to a source 46 of injectable material 74 by a supply line 48. It will be understood by one skilled in the art that the injectable material can be provided in a fluid form, or a solid form, such as a pellet or filament feed, and melted during the injection process. The printhead 72 is shown interconnected to a source 46 of printable material 76, which is typically provided in a filament or wire form, and extends through a supply line 48 to the printhead 72. It will be understood that both the nozzle 70 for injecting the injectable material 74 and the printhead 72 for performing additive manufacturing operations with the printable material 76 can be any number of suitable configurations which would be apparent to one skilled in the art. It is a feature of aspects of the present disclosure that the injectable nozzle 70 and the printhead 72 are carried on a common element, such as arm 68, so that these elements can be moved as a unit for performing molding operations using injectable material 74 and additive manufacturing operations using printable material 76 at various locations with respect to the mold cavity 58 (not shown in the inset orientation of FIG. 6).

FIG. 7 shows an alternative embodiment of the material dispenser 44, in which a source 46 of injectable material 74 is connected via a supply line 48 to a switching device 80. A source 46 of printable material 76 is connected via a supply line 48 to the switching device 80 as well. The switching device 80 is shown in a schematic or diagrammatic form in the example embodiment of FIG. 7 and can be any device which can be mechanically or electronically switched so that the output of the switching device 80 is provided to a combined nozzle 78 adjacent an end of the arm 68. In this manner, injection molding operations can be provided by setting the switching device 80 to fluidly interconnect the source 46 of injectable material 74 via the supply line 48, through the switching device 80, to the combined nozzle 78 which will dispense injectable material through the combined nozzle 78 to the mold cavity 58 as positioned by the arm 68. Alternatively, when the switching device 80 is set to an opposite mode, printable material 76 is provided via a supply line 48 to the switching device 80 so that the printable material is provided to the combined nozzle 78 so that additive manufacturing operations can be performed on a part formed in the mold cavity 58 as positioned by the arm 68. The combined nozzle 78 and switching device 80 can allow for the material dispenser to be provided in a smaller footprint.

FIG. 8 illustrates that the material dispenser 44 can be positioned adjacent to an end of the arm 68 wherein the combined nozzle 78 is shown in greater detail including an optional heat shield 82 with an adjacent injection nozzle 70 and a printhead 72 positioned adjacent in end of the arm 68. The heat shield 82 is preferably positioned between the arm 68 and the injection nozzle 70 and the printhead 72. A source 46 of injectable material 74 can be provided via a supply line 48 to the injection nozzle 70 through the heat shield 82. Alternatively, a source 46 printable material 76 can be provided via a supply line 48 to the printhead 72 through the heat shield 82. In this manner, the arm 68 can positioned the material dispenser 44 with respect to the mold cavity 58 so that injection molding operations can be performed by passing injectable material 74 through the supply line 48 to the nozzle 70 so that portions of a part can be formed in the mold cavity 58 by injecting material from the nozzle 70. Alternatively, additive manufacturing operations can be performed on the part in the mold cavity 58 by passing printable material 76 via the supply line 48 to the printhead 72 as described with respect to the other embodiments of FIGS. 6-8.

Figure 9:
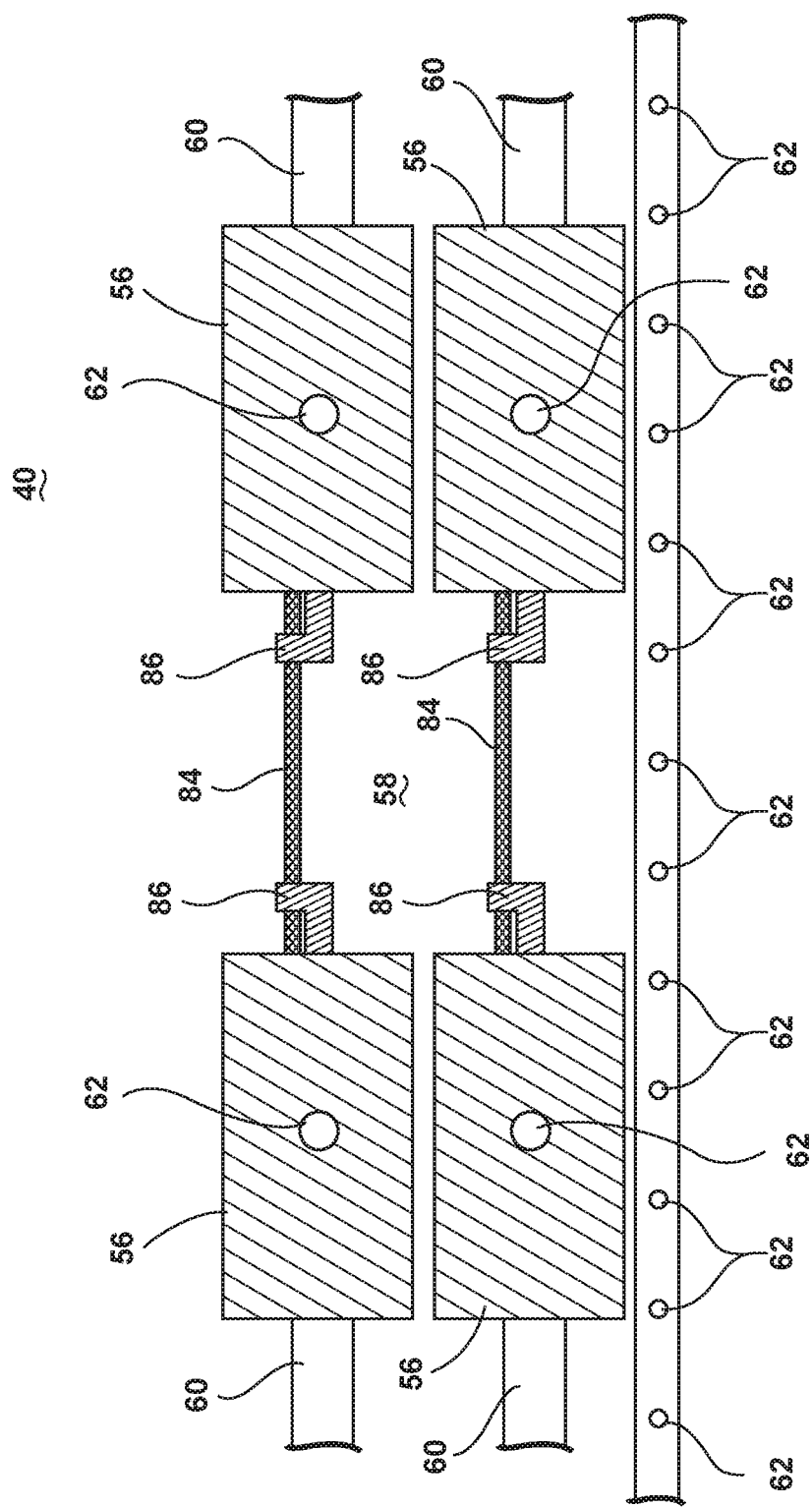
FIG. 9 is an example configuration illustrating the system shown in FIGS. 3-5 and the methods described in FIGS. 1-2 in which a fabric material is suspended on retainers located within a mold cavity.
Figure 10:
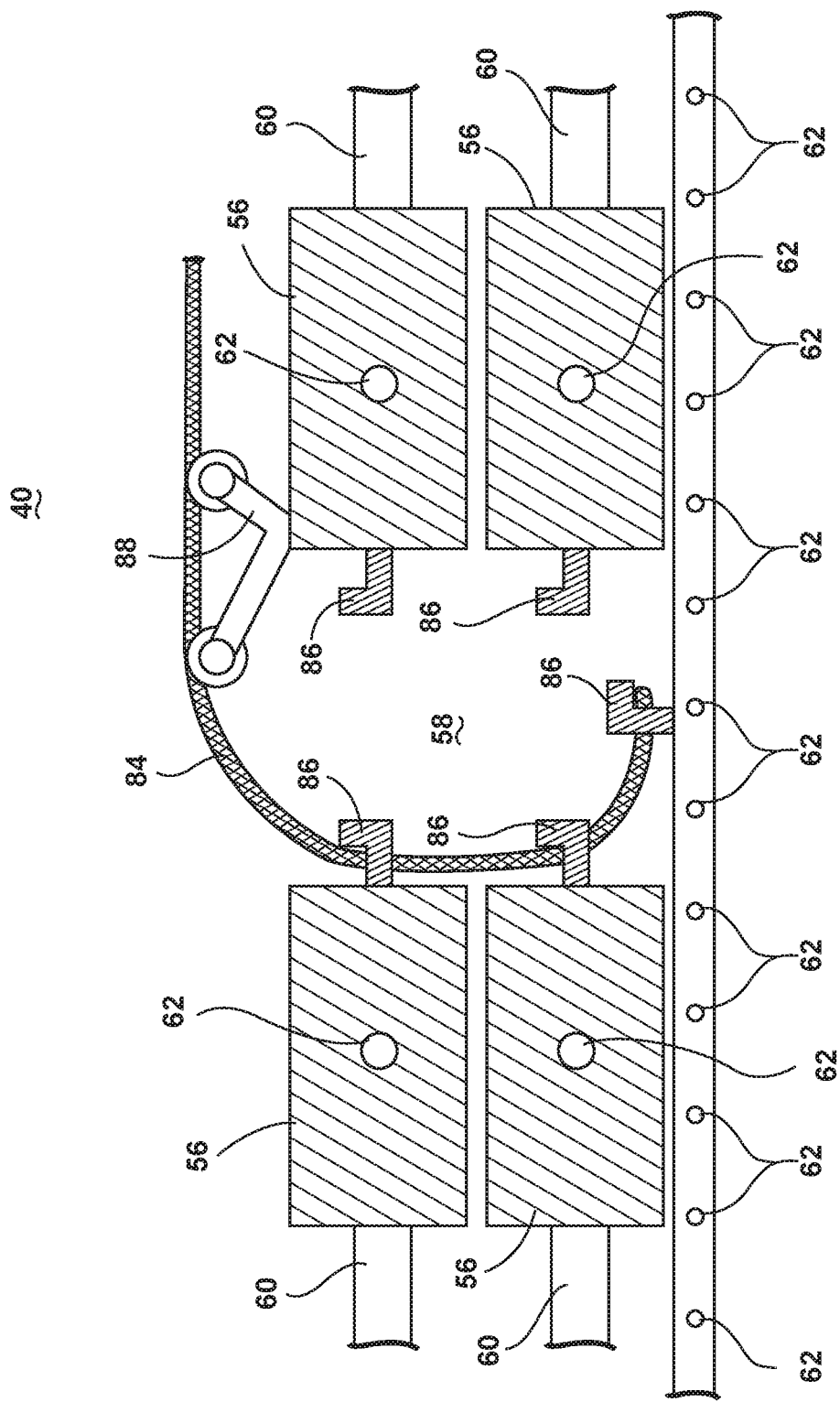
FIG. 10 is an example configuration illustrating the system shown in FIGS. 3-5 and the methods described in FIGS. 1-2 in which a fabric material is suspended on retainers located within a mold cavity in accordance with various aspects described herein.

FIGS. 9-10 show a portion of the system 40 described with respect to FIGS. 3-5 in which fabric, such as a carbon fiber material or a structural woven material, can be located within the mold cavity 58. It will be understood that, components in FIGS. 9-10 that are common with respect to the embodiments of the system 40 described with respect to FIGS. 3-5 are described with like reference numerals and are not described again with respect to FIGS. 9-10.

In the example shown in FIG. 9, a portion of fabric 84 is tensioned across the mold cavity 58 by the provision of hooks 86 within the mold cavity 58 by attachment of the hooks 86 to desired mold portions 56 as shown by example in FIG. 9. In the example shown in FIG. 9, two layers of fabric 84 are shown extending generally horizontally across the mold cavity 58. It would be apparent to one skilled in the art that additional or fewer pieces of fabric 84 can be provided within the mold cavity, and in any desired direction, orientation or volume, without departing from the scope of the present disclosure. As would be apparent to one skilled in the art, the position, location, and size, and type of the fabric 84 would be dictated by the specifics of the part being formed, and the specifics of which should not be construed as being limiting on the scope of the present disclosure.

Once the fabric 84 is positioned across the mold cavity 58 on the hooks 86 in the example of FIG. 9, the manufacturing steps of injecting material into the mold cavity 58 and performing additive manufacturing operations to provide additional material to the part being formed in mold cavity 58 can be performed as described with respect to other aspects of the present disclosure described herein.

Turning to FIG. 10, another example of providing a length of fabric 84 within the mold cavity 58 is shown. In this example, several hooks 86 are provided on a set of the mold portions 56 as well as on the base platform 54. A tensioning device 88 can be provided in a desired position associated with the mold cavity 58, but preferably outside thereof, to provide tension to the fabric 84 as it is provided in a part being formed in the mold cavity 58. As described with respect to other embodiments of the system 40, once the fabric 84 is positioned within the mold cavity 58, the manufacturing operations, including the injection of injectable material and additional additive manufacturing operations including the provision of printable material on a part being formed in the mold cavity 58 can be performed to integrate the fabric 84 into the part being formed in the mold cavity 58. As would be apparent to one skilled in the art, the fabric 84 is shown in the embodiment of FIG. 10 as being an endless length of fabric 84, such as would typically be provided on a roll or spool of material, and provided tensioning by the device 88. Then, once the material has been injected in/or added around the fabric 84 as would be apparent to one skilled in the art, the any remaining fabric 84 not included in the part being formed in the mold cavity 58 can be severed, the part removed from the mold cavity 58, and the next successive length of fabric 84 extended into the mold cavity 58 for subsequent molding and additive manufacturing operations.

Figure 11:
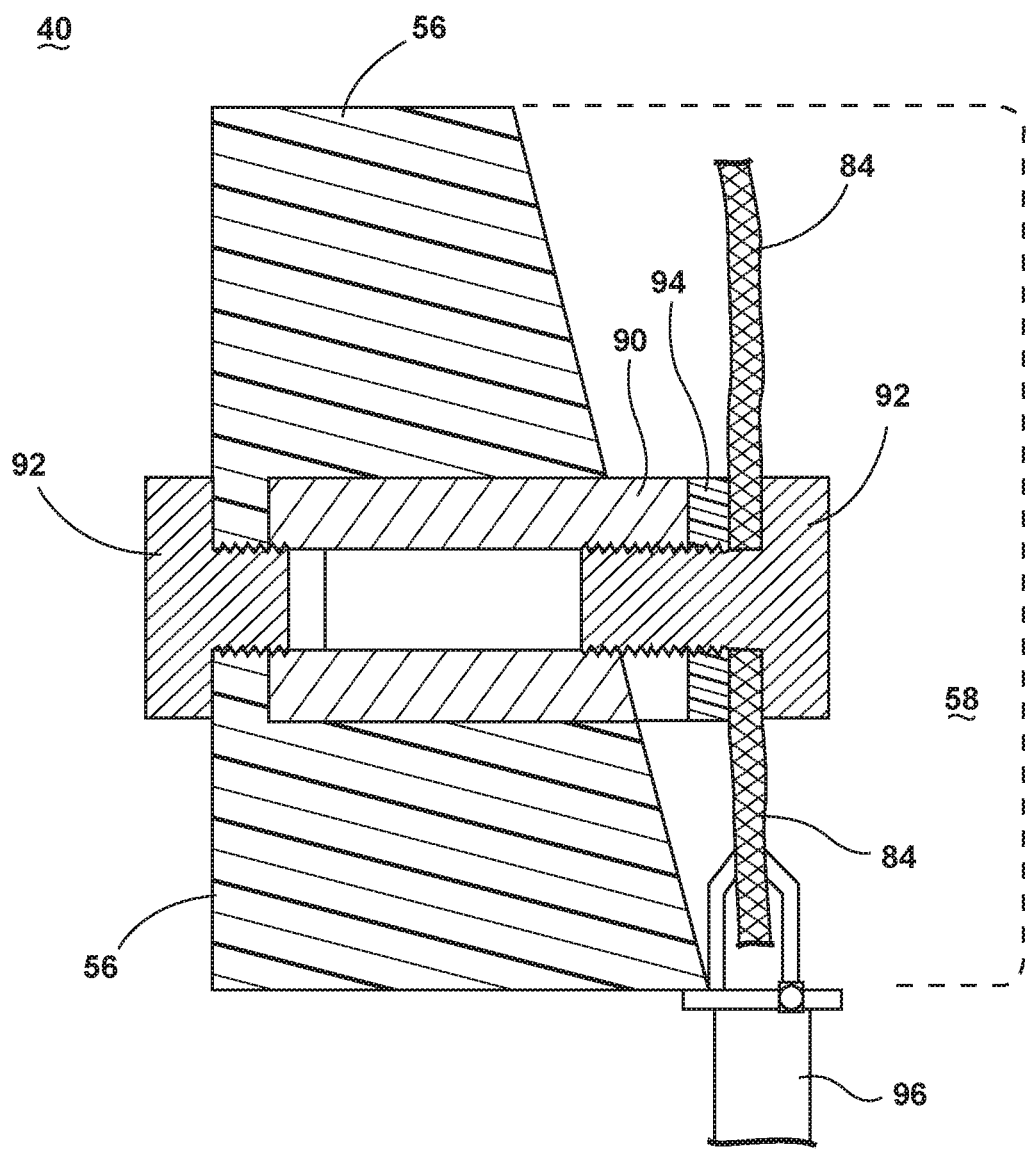
FIG. 11 is an example configuration of a mold according to FIGS. 3-5 and the methods described with respect to FIGS. 1-2 in which a fabric material is suspended with respect to a portion of the mold to enable a fabric material to be provided as a laminar component within a part being manufactured.

FIG. 11 shows enlarged inset portion of a pair of mold portions 56 in an example embodiment of the system 40 described herein. In the example shown in FIG. 11, a sleeve 90 is positioned between a pair of adjacent mold sections 56 and a pair of polymeric threaded fasteners 92 are threaded into the sleeve 90. A washer 94 can optionally be provided between the threaded fasteners 92 as required by a particular operation. The function of the threaded fasteners 92 and its engagement with the sleeve 90 and an optional washer 94 is to retain a portion of the fabric 84 in place during molding operations within the mold cavity 58. A clamping device 96 can be provided associated with the portion of the mold 42, such as the base platform 54, to hold a length of the fabric 84 in place. In order to configure the molding operation for the hybrid manufacturing techniques described herein, a length of the fabric 84 is retained between a threaded fasteners 92 and the sleeve 90 and an optional washer 94 within the mold cavity 58. Then, injection molding techniques and additive manufacturing techniques are performed within the mold cavity 58 which thereby surround the threaded fasteners 92 and the fabric 84 retained between the threaded fasteners 92 and the sleeve 90 and the optional washer 94. Other post-manufacturing finishing operations can be performed by additive manufacturing techniques on the surface of the part formed in the mold cavity, as well as other finishing operations which would be apparent to one skilled in the art.

Figure 12:
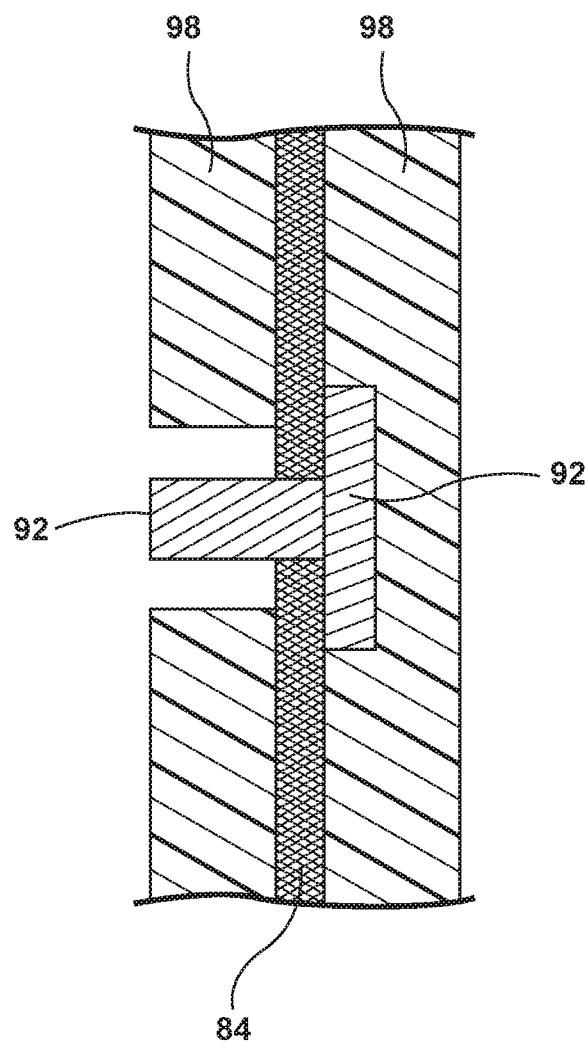
FIG. 12 illustrates an exemplary finished product having a fastener suspended within layers of polymeric material and reinforced fabric material from the mold configuration shown in FIG. 11.
Figure 13:
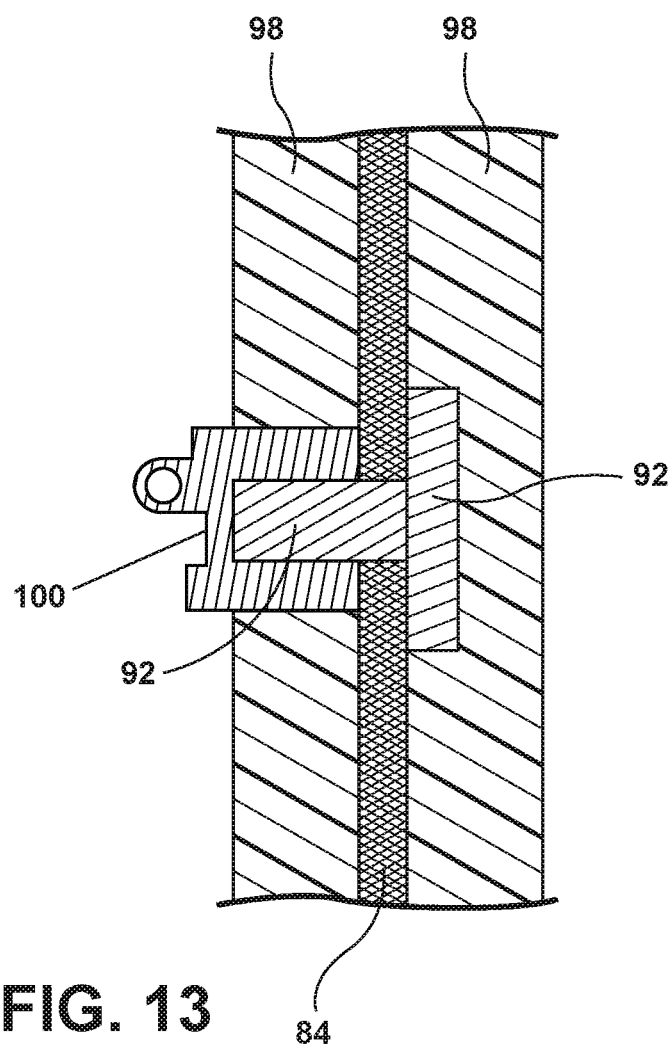
FIG. 13 illustrates the exemplary finished product of FIG. 12 having an additional additive manufacturing component provided thereto after injection molding operations formed the part as shown in FIG. 12.

FIG. 12 shows layers of material 98 surrounding a layer of fabric 84 after injection molding operations have been performed in the mold cavity 58. An aperture left by the removal of the threaded fastener 92 can be filled by additive manufacturing techniques, according to aspects of the present disclosure, to fill the aperture with material as shown in FIG. 12. An example additive component 100 is shown in FIG. 13, which is a view similar to that of FIG. 12, but with an opening filled with the post-injection-operation additive component 100.

Once the manufacturing operations described herein are completed on a part being formed in the mold cavity 58, the mold 42 can be positioned in an open position to allow the part to be removed, or ejected, from the mold 42. It will be understood by one skilled in the art that, to the extent a stacked multiple-part mold is employed, such as one shown by example in the embodiments herein, alternating motion can be imparted to the mold portions 56 between adjacent layers of the mold stack to assist in releasing the part from the mold 42. In addition, pulsating thermal loads can be provided to the mold portions 56 to assist in releasing the part from the mold 42.

The hybrid manufacturing system 40 and method 10 described herein provides a variety of benefits including that they combine desirable features of both injection molding and additive manufacturing techniques allows for rapid part construction using any additive build material (epoxies, plastics, etc.) as well as combining bulk material flow, layer building, molds, and detailed additive manufacturing. The system and method described herein can consist of multiple material dispensing heads and a mold that defines an accessible mold cavity. In some example embodiments described herein, the material dispensing heads can allow for multiple speeds of liquid flow into the mold cavity through a heated nozzle with a controllable flow cross-section (such as with, for example, a screw-actuated valve). The nozzle can switch modes to print detail above and beyond the limits of the mold using additive manufacturing techniques. In another example, the mold itself can be sectioned and actuated to account for complex geometries of parts being produced. The nozzle can also potentially be outfitted with thermal radiation heaters in order to maximize uniformity of temperature between mold, print head, and cooling additive material.

The system 40 and method 10 described herein can handle the manufacture of very long, narrow plastic parts that ordinarily require extremely high pressures and normally would preclude the use of undercuts or complicated geometries because conventional injection molding techniques would require multiple injection points or risk intrinsic thermal stresses. By using a movable injection nozzle such as that described here that can fill a mold as well as print material into or onto the molded part, complex geometry parts can be built in dimensions larger than conventional additive manufacturing processes and at faster speeds. Potential applications could be wind turbine blades or engine turbine blades. Inclusion of carbon fiber within the mold inside a frame would allow rapid carbon-fiber part generation using an automated process.

In the context of additive manufacturing, the system and method described herein allows for faster part development for large volume parts requiring elements such as solid cross sections and detailed features. In the injection molded part technology area, the system and method described herein solves issues associated with very large or long parts which require high injection pressures, multiple plastic gate points, and would suffer from cracking due to thermal stresses intrinsic in large parts which could have non-uniform cooling within the mold when conventional manufacturing techniques would be used.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for manufacturing a part in a mold, comprising:
   providing a source of injectable material;
   providing a source of printable material;
   closing a mold, having a mold cavity, to form a closed mold cavity;
   forming a portion of a part within the mold cavity with a first volume of the injectable material;

opening at least a portion of the mold to allow access to the portion of the part formed in the mold cavity;

printing a second volume of the printable material by additive manufacturing onto the portion of the part formed in the mold cavity to form an additional portion of the part; and removing the part from the mold.

2. The method of claim 1, further comprising the step of providing an injection nozzle fluidly interconnected to the source of injectable material and movably positioned with respect to the mold cavity.

3. The method of claim 2, further comprising the step of providing a printhead fluidly interconnected to the source of printable material and movably positioned with respect to the mold cavity.

4. The method of claim 1, further comprising the step of providing the mold as a series of stacked, movable mold portions which are jointly movable to form the mold cavity in a first mold position, and at least one of the mold portions are movable to form an access point to the mold cavity in a second mold position.

5. The method of claim 1, further comprising the step of locating a fabric material within the mold cavity prior to the step of forming the portion of the part within the mold cavity with a first volume of the injectable material.

6. The method of claim 5 wherein the fabric material includes carbon fiber material.

7. The method of claim 1 further comprising a step of printing an initial volume of the printable material in the mold cavity prior to the step of forming the portion of the part within the mold cavity with the first volume of the injectable material, wherein the initial volume of the printable material and the first volume of the injectable material form at least a portion of the part formed in the mold cavity.

8. The method of claim 1, further comprising the step of forming heating elements into the mold around at least a portion of the mold cavity.

9. The method of claim 1, wherein providing a source of printable material comprises providing the additive build material in the form of a filament or wire.

10. A method for manufacturing a part in a mold, comprising:

forming a mold cavity in the mold with at least one mold portion;

injecting an injectable material by injection molding into the mold cavity to form a first volume of the part;

printing an additive build material by additive manufacturing onto the first volume to form an additional volume of the part; and removing the part from the mold.

11. The method of claim 10, further comprising articulating an arm carrying a material dispenser to reposition the material dispenser.

12. The method of claim 11, further comprising injecting the injectable material or printing the additive build material with the material dispenser.

13. The method of claim 11, further comprising injecting the injectable material and printing the additive build material with the material dispenser.

14. The method of claim 13, further comprising switching the material dispenser between the injectable material and the additive build material.

15. The method of claim 10, further comprising locating a fabric material within the mold cavity prior to injecting the injectable material into the mold cavity.

16. A method of making a part with a system for manufacturing a part in a mold, the method comprising:

forming a mold with at least one mold portion having a mold cavity;

depositing a first material within the mold cavity with a printhead;

depositing a second material within the mold cavity with an injection head; and forming a part by cooperatively depositing the first material by the printhead and the second material by the injection head.

17. The method of claim 16, wherein depositing the second material comprises depositing a material different than the first material.

18. The method of claim 16, further comprising carrying the printhead and injection head with an arm.

19. The method of claim 17, further comprising selecting one of the printhead or the injection head for depositing of the corresponding first or second material into the mold cavity.

* * * * *